US012003022B2

(12) United States Patent
Arendt et al.

(10) Patent No.: US 12,003,022 B2
(45) Date of Patent: Jun. 4, 2024

(54) SCREWABLE VEHICLE ANTENNA

(71) Applicant: Bayerische Motoren Werke Aktiengesellschaft, Munich (DE)

(72) Inventors: Christian Arendt, Munich (DE); Guenter Rohr, Erdweg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/766,554

(22) PCT Filed: Oct. 30, 2020

(86) PCT No.: PCT/EP2020/080525
§ 371 (c)(1),
(2) Date: Apr. 5, 2022

(87) PCT Pub. No.: WO2021/094107
PCT Pub. Date: May 20, 2021

(65) Prior Publication Data
US 2024/0106108 A1 Mar. 28, 2024

(30) Foreign Application Priority Data
Nov. 15, 2019 (DE) ..................... 10 2019 130 860.7

(51) Int. Cl.
*H01Q 1/32* (2006.01)
*H01Q 1/36* (2006.01)
(Continued)

(52) U.S. Cl.
CPC ............. *H01Q 1/3291* (2013.01); *H01Q 1/36* (2013.01); *H01Q 1/44* (2013.01); *H01Q 15/14* (2013.01)

(58) Field of Classification Search
CPC .......... H01Q 1/32; H01Q 1/3291; H01Q 1/36; H01Q 1/44; H01Q 15/14
See application file for complete search history.

(56) References Cited

U.S. PATENT DOCUMENTS

2002/0175868 A1 11/2002 Reichert
2011/0199173 A1 8/2011 Leijssen et al.
2018/0304822 A1 10/2018 Schulte et al.

FOREIGN PATENT DOCUMENTS

CN 105206929 A 12/2015
CN 207528357 U 6/2018
(Continued)

OTHER PUBLICATIONS

International Search Report (PCT/ISA/210) issued in PCT Application No. PCT/EP2020/080525 dated Jan. 22, 2021 with English translation (five (5) pages).
(Continued)

*Primary Examiner* — Hoang V Nguyen
(74) *Attorney, Agent, or Firm* — Crowell & Moring LLP

(57) ABSTRACT

A screwable vehicle antenna has a threaded part and a head part, which adjoins an end region of the threaded part. The threaded part and the head part both are made of electrically non-conductive material. At least one antenna radiator is arranged at least within part of the head part. A metal disk made of electrically conductive material is arranged on the head part and is used as a reflector or a ground plane. An HF electrical connector is provided, which is arranged on and fastened to a region of the head part remote from the threaded part, and the antenna radiator can be electrically connected to a plug of the HF electrical connector.

13 Claims, 4 Drawing Sheets

(51) Int. Cl.
*H01Q 1/44* (2006.01)
*H01Q 15/14* (2006.01)

(56) References Cited

FOREIGN PATENT DOCUMENTS

| | | | | | |
|---|---|---|---|---|---|
| CN | 112385085 | A | * | 2/2021 | ............... H01Q 1/24 |
| DE | 100 56 473 | C1 | | 1/2002 | |
| DE | 10 2012 108 786 | A1 | | 3/2014 | |
| EP | 1 241 731 | A2 | | 9/2002 | |
| EP | 1 622 069 | A1 | | 2/2006 | |
| EP | 3 395 617 | A1 | | 10/2018 | |
| JP | 9-238013 | A | | 9/1997 | |
| JP | 2007-162805 | A | | 6/2007 | |

OTHER PUBLICATIONS

German-language Written Opinion (PCT/ISA/237) issued in PCT Application No. PCT/EP2020/080525 dated Jan. 22, 2021 (six (6) pages).

German-language Search Report issued in German Application No. 10 2019 130 860.7 dated Jul. 2, 2020 with partial English translation (nine (9) pages).

* cited by examiner

SCREWABLE VEHICLE ANTENNA

BACKGROUND AND SUMMARY

The invention relates to a screwable vehicle antenna.

Vehicle antennas are arranged inside or outside the vehicle and are used to provide wireless communication connections, for example for V2X communication, that is to say communication between the vehicle and the surroundings, for example other vehicles, base stations or external devices such as, for example, traffic lights or roadside units. However, they can also provide a communication connection for wireless (near-field) communication in the interior, for example in order to connect vehicle occupants to the entertainment system.

An extremely wide variety of standards are available in order to provide different communication paths, for example near-field communication by means of Bluetooth or WLAN, but also transmission standards from the field of mobile radio, for example LTE or 5G.

Mobile radio antennas are normally fitted outside the vehicle and on top of the roof as so-called shark fin antennas. For V2X communication in particular, the antenna system has to satisfy strict criteria in respect of performance features, in particular omnidirectional emission characteristics, in order to ensure the reliability of transmission of information to further communication partners. Antennas of this kind are generally implemented as separate boxes or other antenna structures, for example as foil antennas which require additional integration volume and/or carrier structures.

Vehicle antennas are known, for example, from DE102012108786A1, EP1241731A2 or EP3395617A1.

The integration of antenna structures in or on the vehicle body is usually limited on account of aesthetic or design criteria, but also owing to performance requirements to be met. Furthermore, space is required for installation, but is a limited resource.

The emission characteristics of a vehicle antenna are mainly prescribed by the integration volume within or in the exterior of the vehicle. Especially for high frequencies such as in the case of V2X communication in which communication currently takes place at 5.9 GHz, the electromagnetic wave propagation can be considered to be quasi-optical, that is to say that any metal object in the area surrounding the antenna blocks or reflects the electromagnetic rays, as a result of which shadowing effects are produced.

In addition, fastening the antenna element to the vehicle body presents a challenge since, in addition to the above-mentioned requirements, requirements in respect of safety, stability, service life and resistance to vibration have to be met too. Furthermore, additional assembly steps are required in order to fasten the antenna element to the vehicle body.

On account of the many, above-described disadvantages of known vehicle antennas, it is an object of this invention to provide a novel vehicle antenna which overcomes these disadvantages. According to the invention, this object is achieved by the features of the independent patent claims. The dependent claims relate to advantageous refinements.

The invention proposes a screwable vehicle antenna, having a threaded part and a head part. The head part adjoins an end region of the threaded part. The threaded part and the head part both are formed from electrically non-conductive material. At least one antenna radiating element is arranged at least within part of the head part, and a metal disk composed of electrically conductive material is arranged on the head part and is used as a reflector or a ground plane. An RF plug-in connector, which is arranged on and fastened to a region of the head part situated opposite the threaded part is further provided, wherein the antenna radiating element can be electrically connected to a plug of the RF plug-in connector.

Owing to the integration of an antenna, that is to say radiating element and reflector or ground plane, in a screw, that is to say an assembly element that is required in any case, both working steps in respect of assembly and also installation space are saved, without the emission properties of the antenna being affected in the process.

The RF plug-in connector used is a suitable watertight or prescribed IP class-compliant or non-watertight RF plug-in connector, depending on the field of application, that is to say in particular depending on installation space. In many applications, an RF plug-in connector provided especially for the required field of application is used. In the automotive sector, the plugs are often what are known as FAKRA plugs. A FAKRA plug is known to a person skilled in the art and is a plug interface which is defined by the known automotive technical working group (FAKRA) and by means of which vehicle communication both in the vehicle interior and also with external devices is performed. It is defined according to DIN-72594-1 and ISO 20860-1 and can be individually encoded for different signals.

Furthermore, it is provided that the metal disk rests on the end region of the head part on which the threaded part is arranged. Therefore, it can simultaneously be used as a washer and can be fitted easily, specifically by being pushed onto the threaded part.

Furthermore, it is provided that the metal disk is arranged at least partially within the head part. Therefore, the length of the threaded part can be shortened. Depending on the embodiment, the metal disk can be arranged entirely within the head part, that is to say such that it is not visible from the outside, for example encapsulated by injection molding with plastic, here. As an alternative, the metal disk can be visible from the outside, so that it subdivides the head part into two parts.

Furthermore, it is provided that a mounting sleeve is formed around the head part, or the head part is formed in a prescribed shape. Therefore, a standard assembly tool can be used for fastening the screw.

Furthermore, it is provided that the thread is a self-tapping thread or a non-self-tapping thread. Therefore, both components which were provided with a mating thread or a cavity beforehand, and components in which the screw is self-tapping by being screwed in, can be fastened.

Furthermore, it is provided that the antenna radiating element provides V2X communication or near-field communication, including at least Bluetooth and WLAN. Therefore, the vehicle antenna can be used both in the interior of the vehicle, for example for controlling functionalities such as the entertainment system via a mobile telephone, and also in the exterior, for example for communicating with a mobile telephone or a key.

Furthermore, it is provided that the screwable vehicle antenna is arranged in the interior of a vehicle or outside the vehicle. The components should therefore meet requirements in respect of watertightness (IPx).

Furthermore, it is provided that the screwable vehicle antenna is used to connect two electrically non-conductive components to one another.

Furthermore, it is provided that the screwable vehicle antenna further has a PCB (printed circuit board) which is arranged between the antenna radiating element and the RF plug-in connector and is provided with elements in such a way that an amplifier circuit or a matching network is provided. In one embodiment, an amplifier component is provided, which is supplied with electrical power by means of a phantom power feed via a coaxial cable fastened to the plug. Therefore, functioning is improved even further. By way of mounting additional electrical components, for example capacitors, an adaptive matching circuit can be implemented, which, depending on the detuning of the antenna, allows or achieves (automatic) retuning by integration into a new installation space which was not initially provided. This increases flexibility when locating the component.

Further features and advantages of the invention can be found in the following description of exemplary embodiments of the invention, with reference to the figures of the drawing, which shows inventive details, and in the claims. The individual features can each be realized separately or together in any desired combination in a variant of the invention.

Preferred embodiments of the invention are explained in more detail below with reference to the appended drawings.

BRIEF DESCRIPTION OF THE DRAWINGS

In the following descriptions of the figures, identical elements or functions are provided with the same reference signs.

DETAILED DESCRIPTION OF THE DRAWINGS

The basic concept of the invention is that of reducing the complexity of assembly and the number of components required by using an existing assembly element. The assembly element is a screw composed of electrically non-conductive material.

Figure 1:
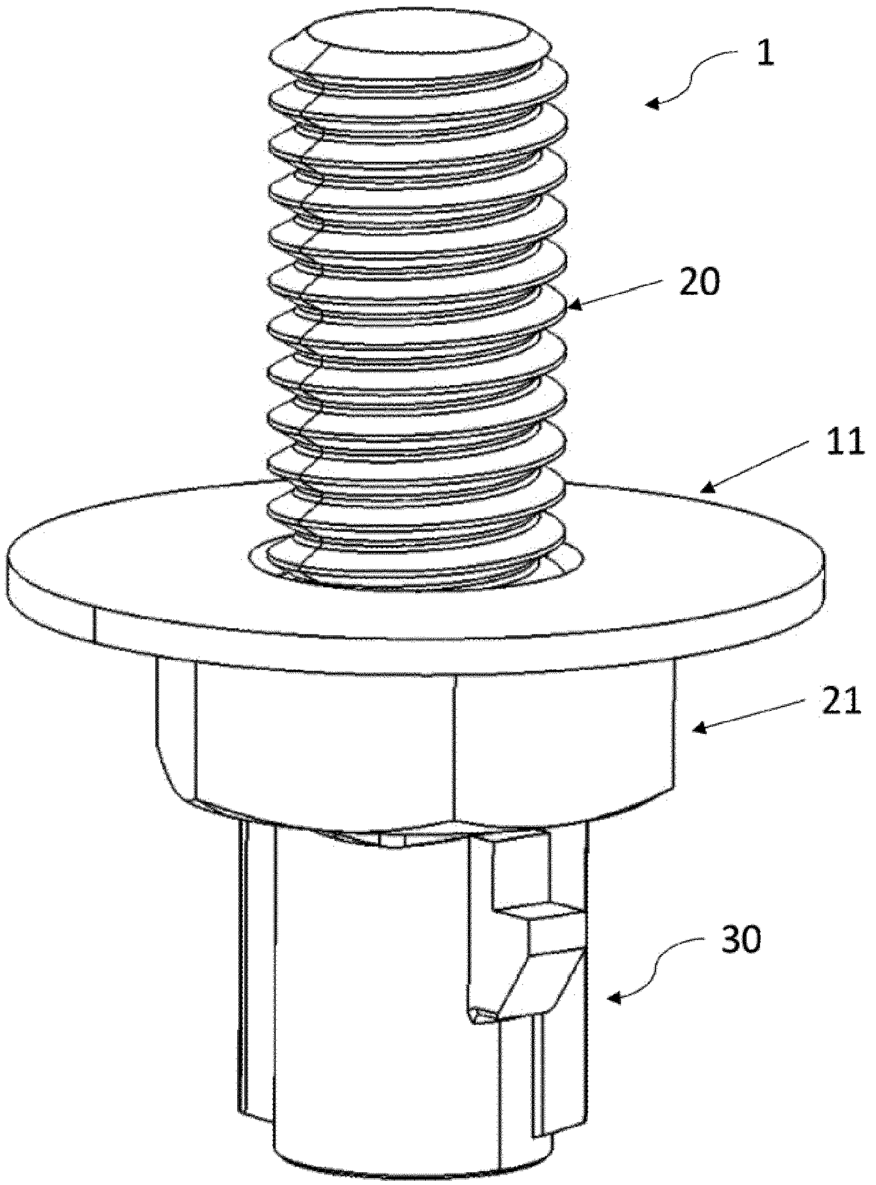
FIG. 1 is a schematic illustration of a screwable vehicle antenna according to one embodiment of the present invention.
Figure 2:
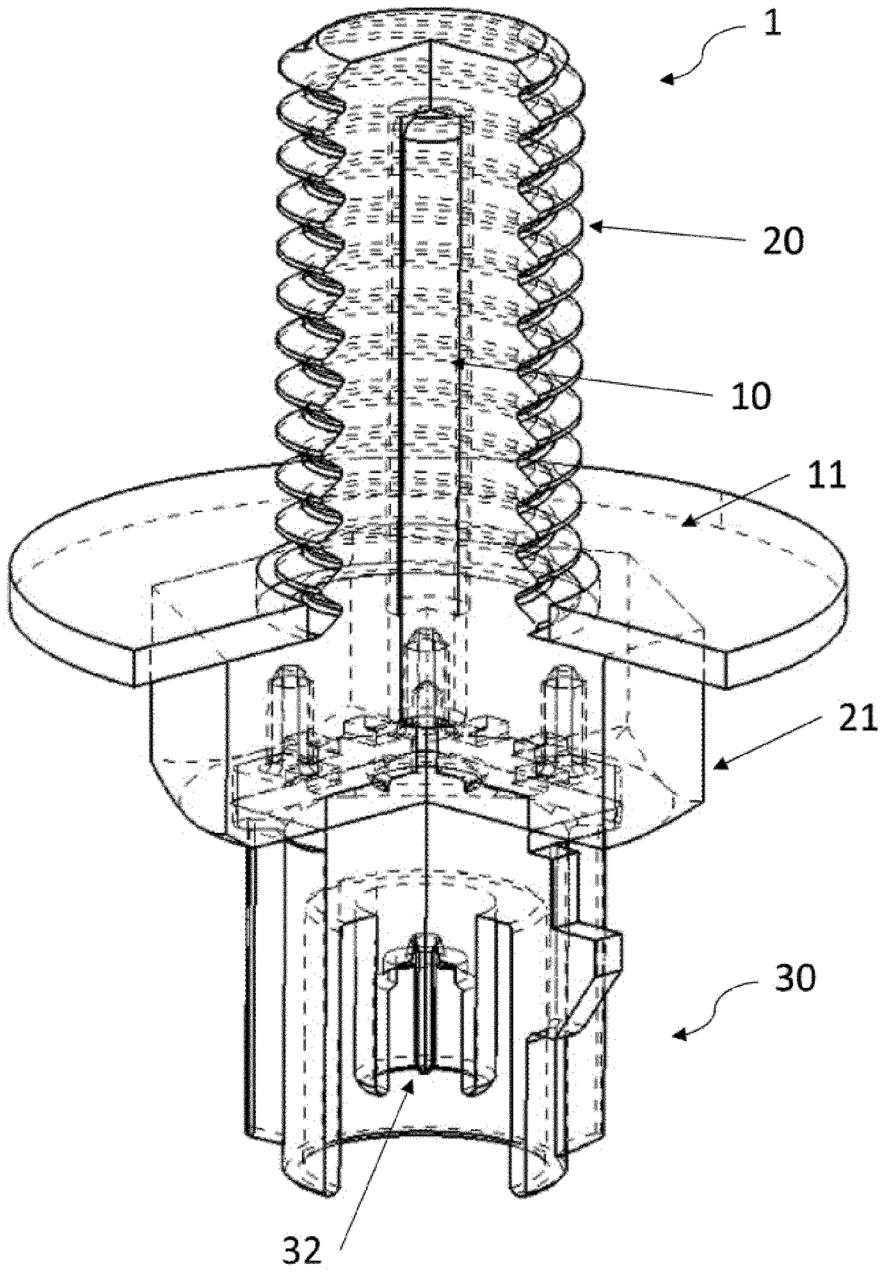
FIG. 2 is a 3D sectional illustration of the screwable vehicle antenna, shown in FIG. 1, according to one embodiment of the present invention.
Figure 3:
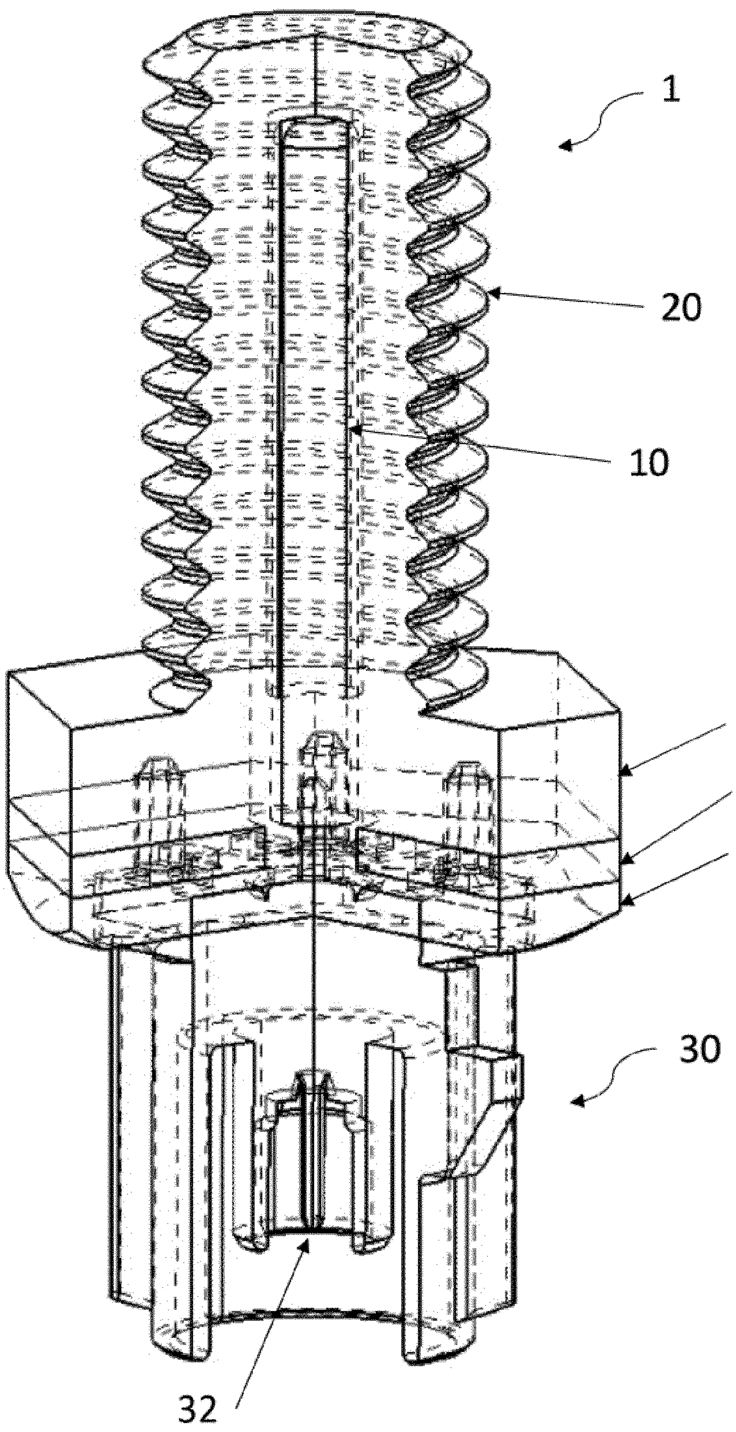
FIG. 3 is a 3D sectional illustration of a screwable vehicle antenna according to an alternative embodiment of the present invention.
Figure 4:
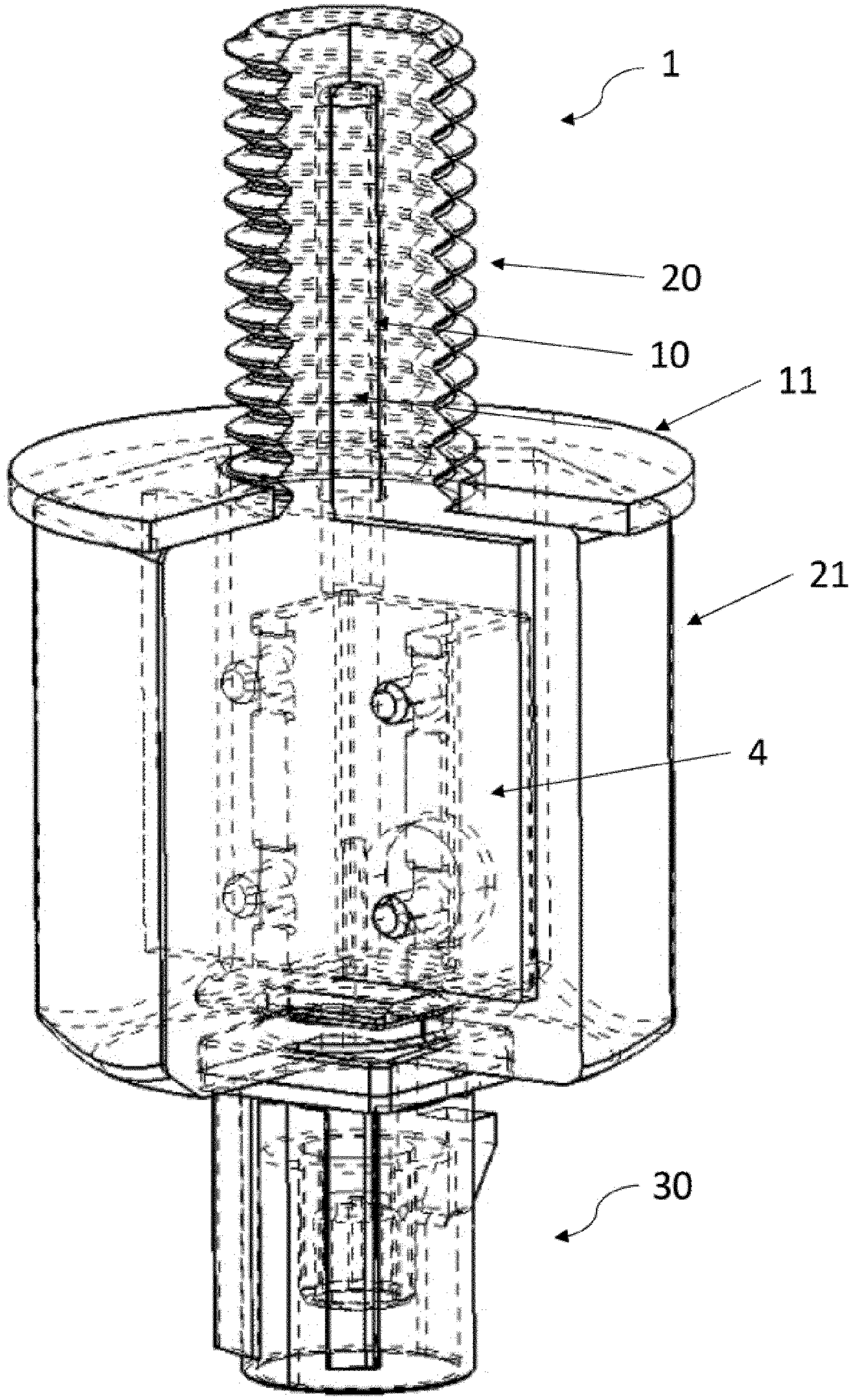
FIG. 4 is a 3D sectional illustration of the screwable vehicle antenna, shown in FIG. 1, with an additional circuit board according to one embodiment of the present invention.

FIG. 1 shows a view of an embodiment of a screwable vehicle antenna 1 according to one exemplary embodiment. FIG. 2 shows a 3D sectional illustration of this embodiment. FIGS. 3 and 4 show 3D sectional illustrations of alternative embodiments of the screwable vehicle antenna 1.

As shown in the 3D sectional illustrations of FIG. 2 (section through FIG. 1) and 3, the antenna radiating element 10 is formed as a rod antenna or monopole antenna and has, for example, a quarter-wave monopole, that is to say the conductor length or rod length corresponds to a quarter of the wavelength to be covered by the antenna radiating element 10. Other suitable antenna forms can be used in principle, provided that they are suitable for the application. The antenna radiating element 10 is inserted into a plastic screw 1 which is formed as a screwable antenna or vehicle antenna. The plastic screw 1 is advantageously used to fasten a plastic component of the vehicle to another plastic component, for example to fasten a spoiler cover to a spoiler lower shell. As an alternative, it is possible to screw the plastic screw 1 into a plastic component, without fastening another plastic component to it, for example as a decorative element or in a position in which it is not visible.

The plastic screw 1 is formed from an electrically non-conductive material, advantageously from plastic or glass fiber-reinforced plastic, depending on the mechanical properties required for the application, that is to say the screw connection.

The plastic screw 1 further has a threaded part 20 and a head part 21 which is arranged on an end region of the threaded part 20. An electrical connection in the form of an RF plug-in connector, advantageously what is known as a FAKRA plug 30, adjoins the head part 21, as illustrated in the figures. The invention will be described in more detail below with reference to the FAKRA plug 30 shown in the figures, wherein any RF plug-in connector that is suitable for the intended application can be used. The FAKRA plug 30 is fastened to the head part 21. For the purpose of electrical connection, a plug 32 for connection to a coaxial cable from the vehicle interior is provided within the FAKRA plug 30. The antenna radiating element 10 is connected to the plug 32 directly or via a microstrip line.

The thread of the threaded part 20 can be embodied as a self-tapping thread or non-self-tapping thread, depending on the use of the screw.

In an embodiment shown in FIG. 2, a metal, electrically conductive disk 11 is further applied over the threaded part 20 and rests on the head part 21. This metal disk 11 serves both as a washer and also as a reflector or ground plane in monopole antennas. The diameter of the metal disk is advantageously greater than the diameter of the head part 21 and is selected such that the desired electrical properties of the antenna are achieved. Furthermore, a ground connection between the ground plane, which is implemented by the metal disk 11 and either rests on the head part 21 or—as described below—is inserted therein, and the outer conductor of the coaxial cable can be established by suitable measures.

In an alternative embodiment shown in FIG. 3, the metal disk 11 is formed as part of the head part 21 or sudivides the head part 21 into two parts. Therefore, the threaded part 20 can be shorter than in the embodiment shown in FIG. 2 since the rod of the antenna radiating element 10 can also be arranged partially in the head part 21. Depending on the position of the metal disk 11 in the head part 21, the length of the threaded part 20 can be shortened or extended.

Advantageously, either a mounting sleeve is formed around the head part 21 or the head part 21 is formed in the corresponding shape, for example as an external hexagon or external hexalobular driving feature, in order to fasten the plastic screw 1 using a standard assembly tool.

FIG. 4 shows a further embodiment in which a PCB 4 (printed circuit board) is provided and is arranged between the antenna radiating element 10 or rod and the FAKRA plug 30. This PCB 4 can be fitted with elements in such a way as to act as an amplifier circuit or as a matching network. Furthermore, an amplifier component can be provided, and electrical power is supplied to the amplifier component by means of a phantom power feed via the coaxial cable fastened to the plug 32. It can have components which serve for compensation purposes, that is to say in order to achieve compensation of the line loss present on account of high frequencies.

The screwable vehicle antenna 1 can be used both for antennas which are intended to provide V2X communication, that is to say currently operate at 5.9 GHz, and also in antennas which support other services, for example near-field communication such as Bluetooth or WLAN. The services described constitute only a sub-quantity of the services to be supported. It is also possible for several services to be covered by the same vehicle antenna.

The screwable vehicle antenna can be used both on the outside as an external antenna of the vehicle and also an internal antenna in the interior of the vehicle. When the vehicle antenna is arranged in the interior, it can also be used in a suitable arrangement as an antenna for V2X communication. However, in this case, it is necessary to ensure that there is no adverse effect on the antenna radiation, for example on account of coated glass panes or shadowing metal parts in the immediate vicinity of the antenna.

The screwable vehicle antenna formed as a plastic screw 1 advantageously replaces a screw formed from plastic for fastening accessory parts, for example spoiler, fender, front skirt, covering caps, fuel filler flap, door handle, headlamp housing, decorative elements on the outside and paneling elements, decorative elements and other accessory parts in the inside. It is only necessary to ensure that the propagation of the electromagnetic waves is not adversely affected, for example by metal objects. Different thread diameters and also thread lengths can further be implemented, depending on the application.

Owing to the combination of the antenna element and the fastening element in one component, assembly is simplified, installation space is saved and the integration of components into the vehicle is made easier. In addition, installation space in the vehicle that is currently not used can be rendered functional under certain circumstances.

REFERENCE SIGNS

100 Screwable antenna, vehicle antenna
1 Plastic screw
10 Antenna radiating element
11 Reflector/ground plane/washer
20 Threaded part
21 Screw head
30 RF plug-in connector, here FAKRA plug
32 Plug
4 PCB/printed circuit board.

What is claimed is:

1. A screwable vehicle antenna, comprising:

a threaded part and a head part, which head part adjoins an end region of the threaded part, the threaded part and the head part both being formed from electrically non-conductive material;

at least one antenna radiating element, which is arranged at least within part of the head part;

a metal disk composed of electrically conductive material, which is arranged on the head part and is used as a reflector or a ground plane; and an RF plug-in connector, which is arranged on and fastened to a region of the head part situated opposite the threaded part, wherein the antenna radiating element is electrically connectable to a plug of the RF plug-in connector.

2. The screwable vehicle antenna according to claim 1, wherein the metal disk rests on the end region of the head part on which the threaded part is arranged.

3. The screwable vehicle antenna according to claim 1, wherein the metal disk is arranged at least partially within the head part.

4. The screwable vehicle antenna according to claim 1, wherein a mounting sleeve is formed around the head part, or the head part is formed in a prescribed shape.

5. The screwable vehicle antenna according to claim 1, wherein the thread is a self-tapping thread.

6. The screwable vehicle antenna according to claim 1, wherein the thread is a non-self-tapping thread.

7. The screwable vehicle antenna according to claim 1, wherein the antenna radiating element provides V2X communication or near-field communication.

8. The screwable vehicle antenna according to claim 7, wherein the communication is Bluetooth or WLAN.

9. The screwable vehicle antenna according to claim 1, wherein the antenna is arranged in an interior of a vehicle.

10. The screwable vehicle antenna according to claim 1, wherein the antenna is arranged outside the vehicle.

11. The screwable vehicle antenna according to claim 1, wherein the antenna is used to connect two electrically non-conductive components to one another.

12. The screwable vehicle antenna according to claim 1, further comprising:

a PCB arranged between the antenna radiating element and the RF plug-in connector, wherein the PCB is provided with elements comprising an amplifier circuit or a matching network.

13. The screwable vehicle antenna according to claim 12, wherein an amplifier is provided, which is supplied with electrical power by a phantom power feed via a coaxial cable fastened to the plug.

* * * * *